United States Patent [19]

Hirajima et al.

[11] Patent Number: 5,694,386
[45] Date of Patent: Dec. 2, 1997

[54] INTERPOLATING GAIN AMPLIFIER FOR INFORMATION REPRODUCING APPARATUS

[75] Inventors: Hiroshige Hirajima, Tenri; Hiroshi Fuji, Soraku-gun, both of Japan

[73] Assignee: Sharp Kabushiki Kaisha, Japan

[21] Appl. No.: 330,855

[22] Filed: Oct. 27, 1994

[30] Foreign Application Priority Data

Oct. 29, 1993 [JP] Japan .................. 5-272516

[51] Int. Cl.$^6$ ................................ G11B 7/00
[52] U.S. Cl. ................ 369/124; 369/48; 369/32
[58] Field of Search .................. 360/53, 77.03, 360/77.04; 369/13, 59, 124, 47, 48, 32; 330/254, 278

[56] References Cited

U.S. PATENT DOCUMENTS

| | | | |
|---|---|---|---|
| 4,970,594 | 11/1990 | Kitaura et al. | 358/172 |
| 5,012,461 | 4/1991 | Yoshida et al. | 369/32 |
| 5,212,562 | 5/1993 | Ogura | 358/338 |
| 5,361,247 | 11/1994 | Fuji et al. | 369/48 |

FOREIGN PATENT DOCUMENTS

| | | |
|---|---|---|
| 60-10475 | 1/1985 | Japan . |
| 61-287073 | 12/1986 | Japan . |
| 1-282777 | 11/1989 | Japan . |
| 5-47111 | 2/1993 | Japan . |
| 5-47112 | 2/1993 | Japan . |

*Primary Examiner*—Georgia Y. Epps
*Assistant Examiner*—Tan Dinh
*Attorney, Agent, or Firm*—Nixon & Vanderhye

[57] ABSTRACT

An information reproducing apparatus which includes: pickup section for converting information recorded in a recording medium into an electrical signal; preprocessing section for amplifying a signal output from the pickup section; automatic gain control circuit for receiving a signal output from the preprocessing section as an input signal and for eliminating an amplitude change component other than the information from the input signal; and digital signal reproducing section for reproducing a digital signal corresponding to a signal output from the automatic gain control circuit, the automatic gain control circuit including: amplifier section for amplifying the input signal so as to be output as an output signal, and for receiving a control signal for controlling a gain; and control section for controlling the gain of the amplifier section, the control section including: amplitude detector for detecting an amplitude of the output signal; control signal generator for generating a control signal corresponding to the amplitude of the output signal; memory section for storing the control signal; and interpolation section for detecting an error signal caused by an input signal in an impulse form from the control signal and replacing the error signal with an interpolation signal.

9 Claims, 16 Drawing Sheets

FIG.5A a1
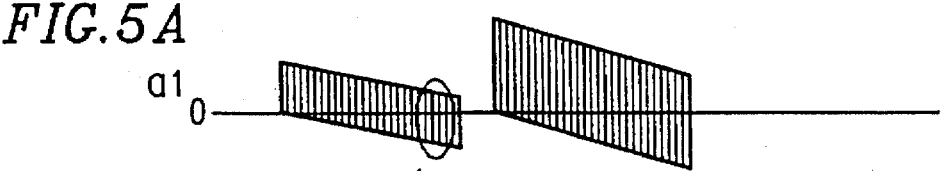
FIG.5B
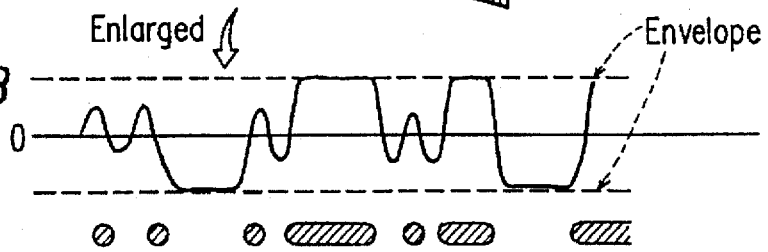
Enlarged
Envelope
FIG.5C b1
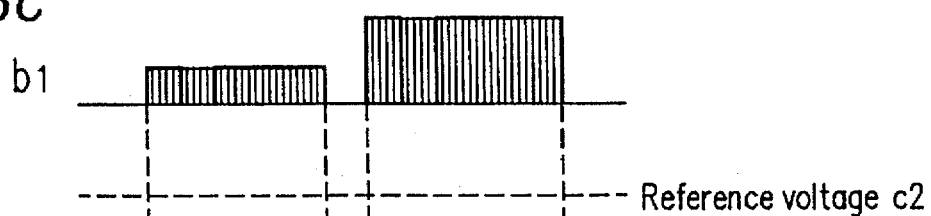
Reference voltage c2
FIG.5D a3
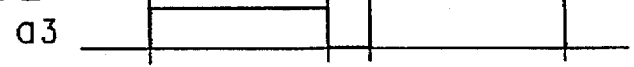
FIG.5E b2
FIG.5F a4
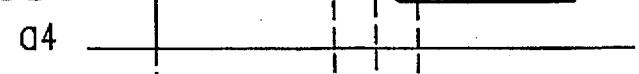
FIG.5G a2

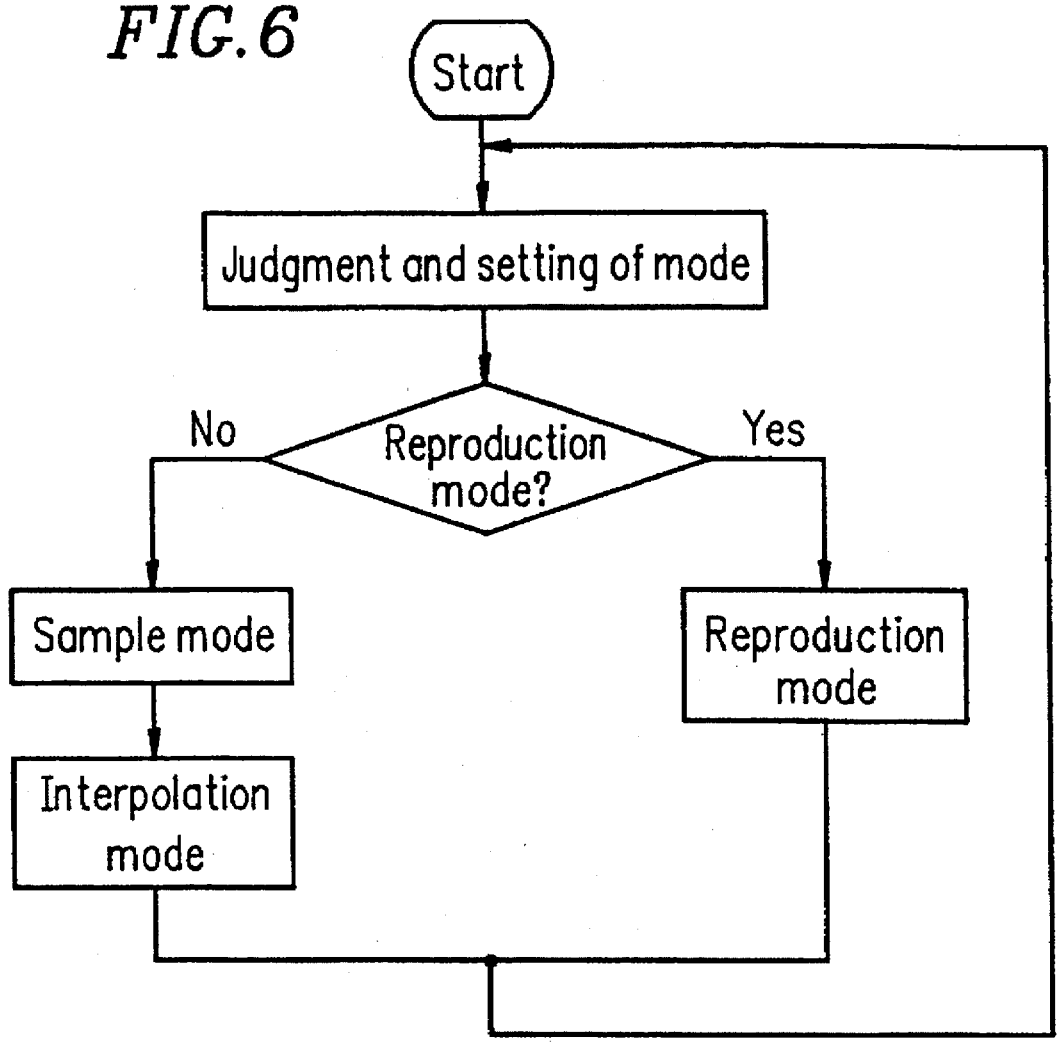

Normal

After sampling

△ --- Mean value of preceding and following two points 5,694,386

INTERPOLATING GAIN AMPLIFIER FOR INFORMATION REPRODUCING APPARATUS

BACKGROUND OF THE INVENTION

1. Field of the Invention

The present invention relates to an information reproducing apparatus, and more specifically, to an information reproducing apparatus using an automatic gain controller having a means for interpolating the control signal corresponding to an input signal in the spike form.

2. Description of the Related Art

A recording medium such as a magneto-optic disk has a planar recording region, in which the amplitude of a reproduction signal is likely to vary due to uneven coating on a magnetic substance of the recording medium or due to the difference of the reflectance and Kerr rotation angle of the disk in one part on the disk from another. The amplitude of the reproduction signal also changes when a different disk is used. In some cases, the amplitude of the reproduction signal changes even in the same disk, depending on the difference of the position from which information is read out (hereinafter, referred to as "read position"). Specifically, the read position indicates a point at which a pickup of the magneto-optic disk or the like is located.

With reference to FIGS. 14A through 14E, the change in the amplitude of the reproduction signal depending on the read position of the same disk will be described. FIG. 14A is a plan view showing the disk. FIG. 14B is a diagram showing the change in the amplitude of the reproduction signal along with the change in the position of a sector, when reproducing one track from the center portion (A1–A8) of the disk (referred to as "a sector-voltage characteristics diagram"). FIG. 14C is a sector-voltage characteristics diagram when reproducing one track from the middle portion (B1–B8) of the disk. FIG. 14D is a sector-voltage characteristics diagram when reproducing one track from the peripheral portion (C1–C8) of the disk. FIG. 14E is a diagram showing, in a three-dimensional way, the change in the amplitude of the reproduction signal at each sector as shown in FIGS. 14B through 14D. As shown in FIGS. 14A through 14E, the amplitude changes depending on where the track to be reproduced is positioned, even in the same disk. Also, the amplitude changes differently in one disk from another. Also, since the recording medium rotates, the amplitude changes continuously and periodically.

Because the reproduction signal reproduced from the optical pickup or the like is an analog signal, it needs to be A/D converted for digital processing. A change in the amplitude of an input signal to an A/D convertor may cause the input signal to deviate from a dynamic range possessed by the A/D convertor. This results in a rise in the error rate (a rate at which the data is erroneously read). Therefore, in order to keep the amplitude of the reproduction signal within the dynamic range of the A/D convertor, the information reproducing apparatus such as a magneto-optic disk needs a circuit for making the amplitude of the reproduction signal constant. The circuit making the amplitude of the reproduction signal constant is generally called an automatic gain control circuit (hereinafter, referred to as "an AGC circuit"). Assuming that data stored in the recording medium, for example A/D converted data, is called "information", the AGC circuit can be defined as a circuit that eliminates an undesirable amplitude change component except for the information. There is also proposed an AGC circuit to which a memory means (e.g., a semiconductor memory) is added for the purpose of omitting the undesirable amplitude change component except for the information.

For example, Japanese Laid-Open Patent Publication No. 61-287073 describes, as a conventional technique for detecting the change in the amplitude, the usage of the amplitude of a burst signal contained in the reproduction signal and output at predetermined intervals and the use of the memory means for a detection circuit generating a control voltage of a voltage control amplifier (VCA). In addition, it points out that since a time constant circuit is used as the detecting means in this conventional technique, the response speed of the time constant circuit delays that of the AGC circuit. The invention described in Japanese Laid-Open Patent Publication No. 61-287073 (hereinafter, referred to as "the first prior art") uses a memory means for reducing the effects of the time constant circuit.

Japanese Laid-Open Patent Publication No. 5-47111 describes recording the reference recording pattern onto the disk so as to detect the amplitude for realization of the automatic gain control, and controlling the gain for the reproduction signal from the data region based on the amplitude of the reproduction signal from the reference recording pattern. According to Japanese Laid-Open Patent Publication No. 5-47111 (hereinafter, referred to as "the second prior art"), the amplitude of the reproduction signal is detected and the resultant value is averaged by a hold circuit, and thereafter the gain of the amplifier is controlled. In addition, there are also proposed as the examples of the invention, the gain control method using the information of an address being reproduced, the gain control method using a ROM as a memory means, and other conventional techniques.

Japanese Laid-Open Patent Publication No. 5-47112 describes an invention performing an offset adjustment in corporation with the second prior art (hereinafter, referred to as "the third prior art").

FIG. 15 is a block diagram showing the AGC circuit of a known information reproducing apparatus. All the above-mentioned prior arts have the configuration as shown in FIG. 15, consisting of an AGC circuit 31 and a memory section 32 for storing data for controlling the AGC circuit 31 and outputting the data thereto. The control process for controlling the known AGC circuit shown in FIG. 16 includes a read mode (similar to "a sample mode" of the present invention) and a write mode (equivalent to "a reproduction mode" of the present invention). The write mode is a mode in which a signal for controlling the AGC circuit is written into the memory section. The read mode is a mode in which the control signal stored in the memory section is read out so as to control the AGC circuit.

However, the above-mentioned prior arts have some problems. First, a defect in the optical information recording medium may cause the amplitude of the reproduced signal to be larger or smaller in the spike form compared with the normal amplitude. This pulse in the spike form will be referred to as "a defect pulse", hereinafter. Upon inputting the defect pulse, a control signal (the peak portion of a graph shown in FIG. 17A) is taken into the memory section, and then output to a variable gain amplifier. For example, when a defect pulse having an amplitude larger than that of normal one is input as shown in FIG. 17A, the gain of the variable gain amplifier becomes excessively small. Furthermore, when the gain of the variable gain amplifier is excessively controlled by a defect pulse (hereinafter, referred to as "the malfunction of the variable gain amplifier caused by a defect pulse"), a certain time has to elapse before the gain returns to its proper value. Accordingly, when the variable gain amplifier malfunctions, the amplitude of the output signal becomes improper, which results in a higher error rate for the information reproducing apparatus.

The above-mentioned first prior art can not prevent the malfunction of the AGC circuit caused by the control signal corresponding to the defect pulse (hereinafter, referred to as "an error signal"). As in the second and third conventional techniques, even if removing the error signal by averaging the amplitudes sampled at a plurality of sampling points, there arises the following problem. That is, as shown in FIG. 17B, the precedent and following points are also affected by the averaging, so that the gain can not be correctly controlled. The averaging can be made more effective by increasing the number of the sampling points for the averaging. As a result, though the amplitude of the control signal is smoothed, there arises other problems. For example, a memory with a larger capacity, a circuit of a more complicated configuration or the like becomes necessary.

The present invention has been made for overcoming the above-mentioned problems, and thus is directed to an information reproducing apparatus in which the error rate does not increase even when a defect impulse is input, and an automatic gain controller without any malfunction caused by the defect pulse, realized by interpolating an error signal with a signal approximate to the control signal corresponding to a proper amplitude (hereinafter, referred to as "an interpolation signal").

SUMMARY OF THE INVENTION

The information reproducing apparatus of this invention includes: pickup means for converting information recorded in a recording medium into an electrical signal; preprocessing means for amplifying a signal output from the pickup means; automatic gain control means for receiving a signal output from the preprocessing means as an input signal and for eliminating an amplitude change component other than the information from the input signal; and digital signal reproducing means for reproducing a digital signal corresponding to a signal output from the automatic gain control means, the automatic gain control means including: amplifier means for amplifying the input signal so as to be output as an output signal, and for receiving a control signal for controlling a gain; and control means for controlling the gain of the amplifier means, the control means including: amplitude detecting means for detecting an amplitude of the output signal; control signal generating means for generating a control signal corresponding to the amplitude of the output signal; memory means for storing the control signal; and interpolation means for detecting an error signal caused by an input signal in an impulse form from the control signal and replacing the error signal with an interpolation signal.

In one embodiment, the information reproducing apparatus further includes control signal recording means for recording a control signal replaced with the interpolation signal into the recording medium.

In another embodiment, the recording medium is a magneto-optic disk.

In still another embodiment, the interpolation means replaces an error signal corresponding to a time t(n) with an interpolation signal obtained by averaging a control signal at a time t(n−1) and that at a time t(n+1).

In still another embodiment, the interpolation means replaces an error signal corresponding to a time t(n) with an interpolation signal linearly approximated by a control signal at a time t(n−2) and that at a time t(n−1).

In still another embodiment, the interpolation means replaces an error signal corresponding to a time t(n) with a control signal at a time t(n−1).

In still another embodiment, the memory means includes: a high-pass filter, a comparator, a reference voltage source, and a memory wherein the high-pass filter receives the control signal as an input signal and outputs a high frequency component of the control signal to the comparator as an output signal, and wherein the comparator, by comparing the output voltage of the high-pass filter with the voltage of the reference voltage source, outputs an error bit corresponding to whether the control signal is the error signal to the memory.

According to the information reproducing apparatus of the present invention, in the interpolation section, the error data (an A/D converted error signal) caused by the defect pulse is detected among the control data (an A/D converted control signal) stored in the memory section. In the interpolation section, the interpolation data (an A/D converted interpolation signal) for replacing the error data is generated, and the error data is replaced with the interpolation data. The replaced control data is D/A converted and then output as the control signal for controlling the gain of the variable gain amplifier.

Thus, the invention described herein makes possible the advantages of providing (1) an information reproducing apparatus in which the error rate at the time of reproducing information is reduced by providing an interpolation section in an automatic gain control section; (2) an information reproducing apparatus in which the necessity of performing an interpolation every time information is reproduced does not exist, realized by recording the control signal replaced with an interpolation signal onto an external recording medium; (3) an information reproducing apparatus capable of a precise interpolation, realized by using a mean value interpolation as an interpolation technique; (4) an information reproducing apparatus capable of following even a linear change in a control signal, realized by using a first-order interpolation as an interpolation technique; (5) an information reproducing apparatus capable of a high-speed operation without the calculation for an interpolation, realized by using a zero order interpolation as an interpolation technique; (6) an information reproducing apparatus with little malfunction, realized by providing a CPU as an interpolation means; and (7) an information reproducing apparatus capable of high-speed operation, realized by the memory means simultaneously performing the sampling of a control signal and the detection of an error signal.

These and other advantages of the present invention will become apparent to those skilled in the art upon reading and understanding the following detailed description with reference to the accompanying figures.

BRIEF DESCRIPTION OF THE DRAWINGS

FIGS. 5A through 5G are diagrams showing the waveforms of each component of the AGC circuit shown in FIG. 3.

FIG. 6 is a flow chart showing an operation mode for the AGC circuit shown in FIG. 2.

DESCRIPTION OF THE PREFERRED EMBODIMENTS

EXAMPLE 1

Figure 1:
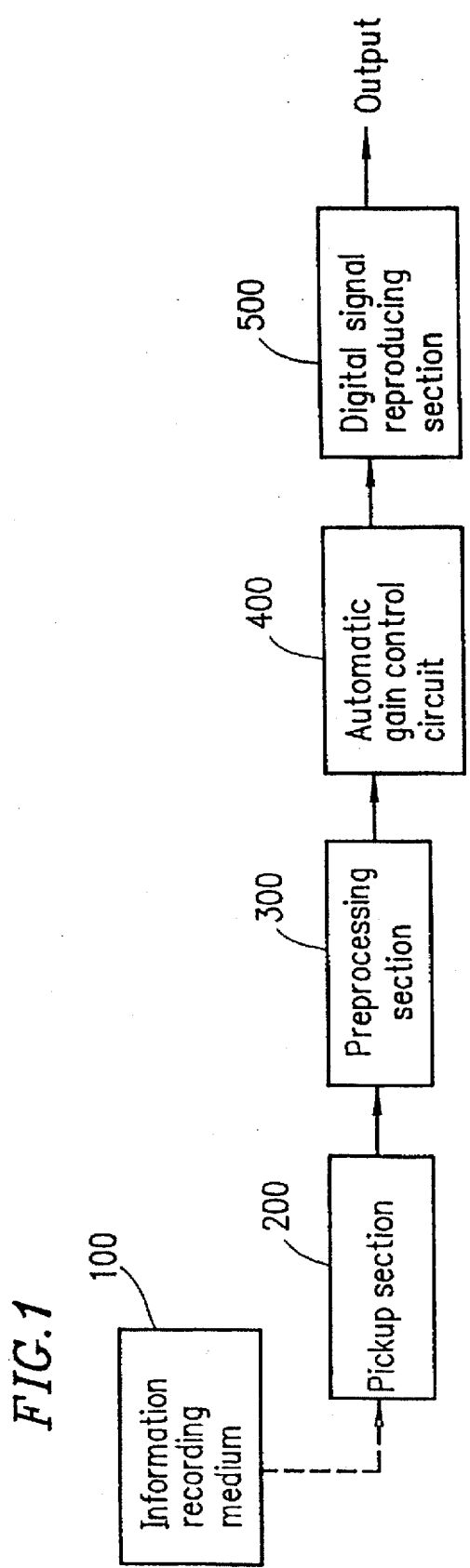
FIG. 1 is a block diagram showing the configuration of an information reproducing apparatus of one example of the present invention.

Hereinafter, the present invention will be described referring to the accompanying drawings. Like reference numerals refer to like structural components.

FIG. 1 is a block diagram showing an information reproducing apparatus of the present invention. The information reproducing apparatus refers to an apparatus which optically reproduces information. As a recording medium 100, a magneto-optic disk, an optical card, an optical tape or the like may be used. A pickup section 200 converts the information stored in the recording medium 100 into an electrical signal. The pickup section 200 includes a light emitting device (not shown) and a photodetective element (not shown). The light emitting device emits light on the recording medium 100. The photodetective element receives the light emitted from the light emitting device and reflected by the recording medium 100, and converts the received light into an electrical signal. A preprocessing section 300 amplifies the electrical signal converted by the pickup section 200. Since the electrical signal from the pickup section 200 is weak, this preprocessing section 300 is required. For example, the preprocessing section 300 includes an amplifier and a low-pass filter (LPF). In this case, the signal from the pickup section 200 is amplified by the amplifier. Then, noise is removed from the signal by the LPF. An automatic gain control circuit (AGC circuit) 400 removes an amplitude change component other than the information component from the signal component provided by the preprocessing section 300. A digital signal reproducing section 500 receives a signal output from the AGC circuit 400 and reproduces a digital signal corresponding to the information.

Figure 2:
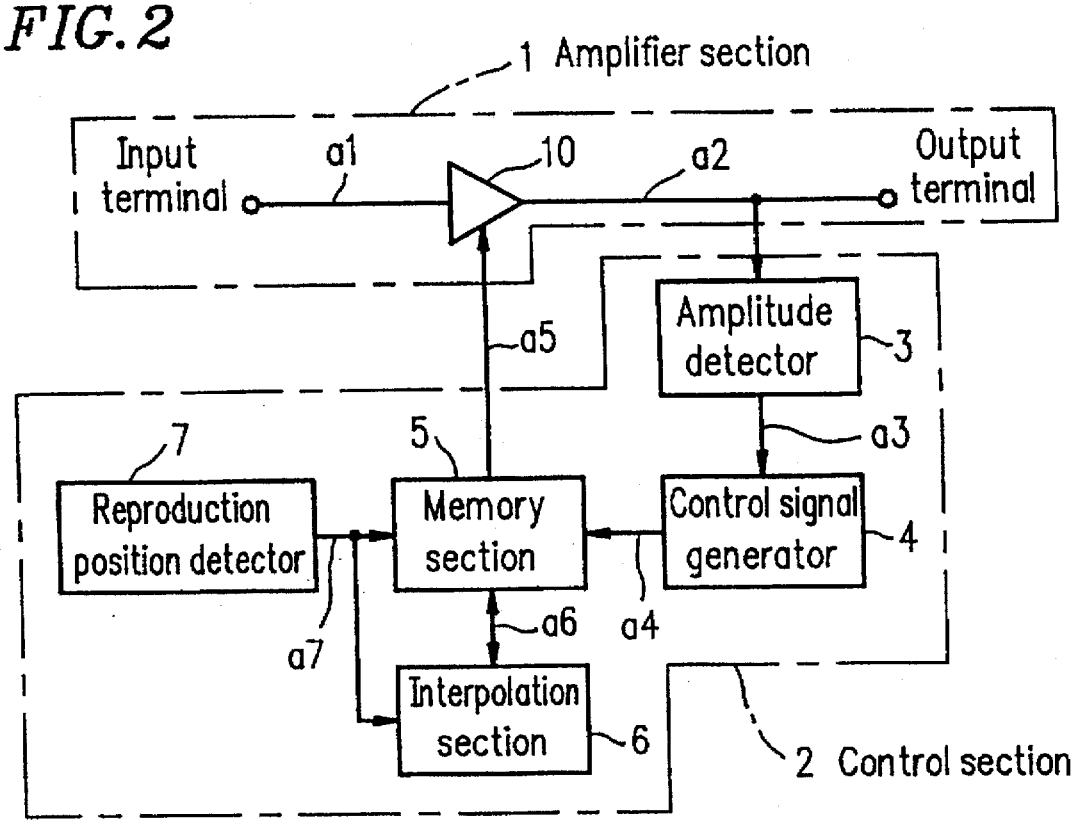
FIG. 2 is a block diagram showing the configuration of an AGC circuit of one example of the present invention.

FIG. 2 is a block diagram showing the AGC circuit 400 shown in FIG. 1. The AGC circuit shown in FIG. 2 includes an amplifier section 1 and a control section 2. The amplifier section 1 amplifies an input signal a1 and outputs an output signal a2. The control section 2 controls the gain of the amplifier section 1 in accordance with the output signal a2.

Figure 3:
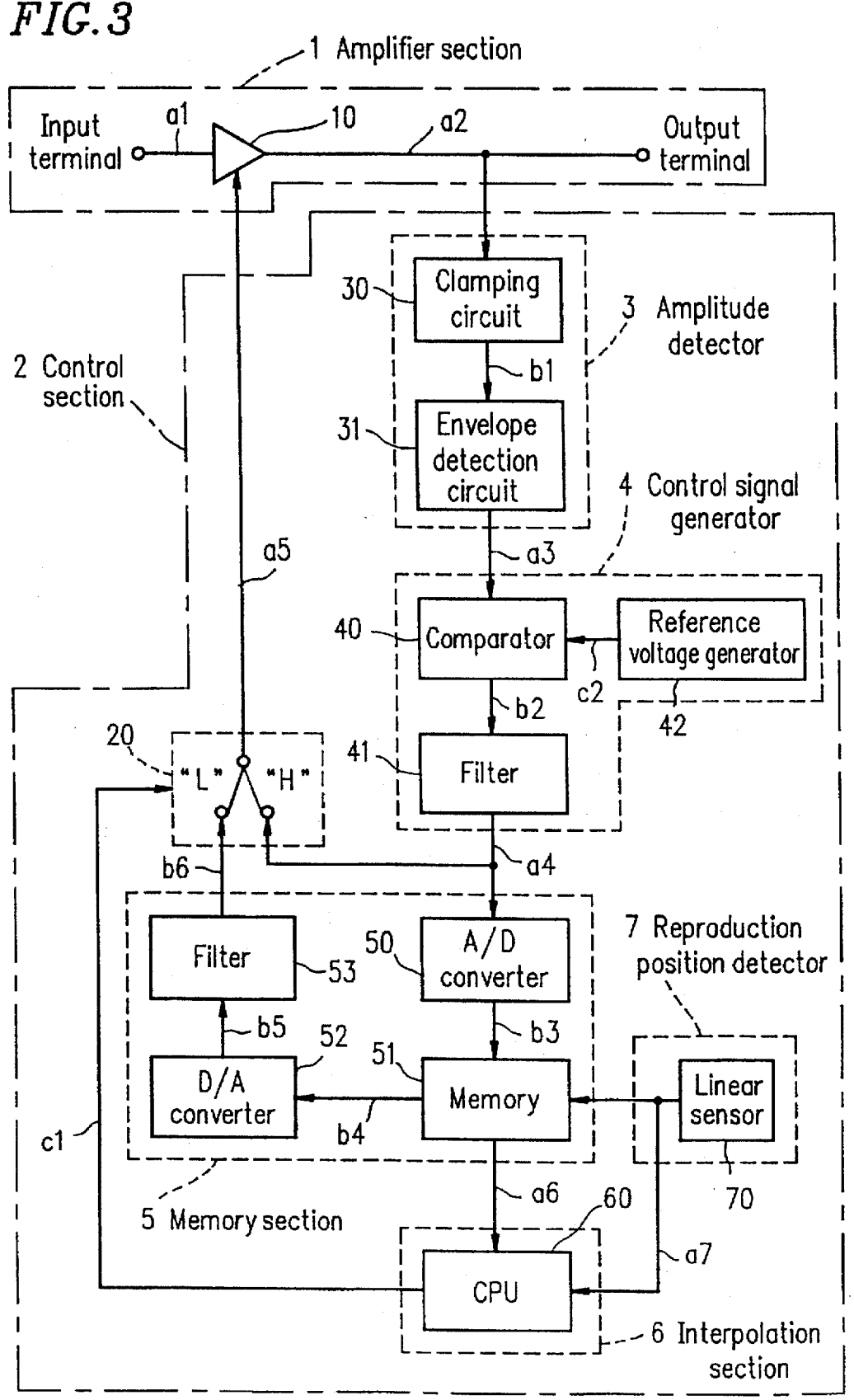
FIG. 3 is a block diagram showing the configuration of the AGC circuit of one example of the present invention in more detail.

FIG. 3 is a block diagram showing the circuit shown in FIG. 2 in more detail.

The amplifier section 1 has a variable gain amplifier 10. The variable gain amplifier 10 amplifies the input signal a1 input at an input terminal and outputs the output signal a2 output to the output terminal. The gain of the variable gain amplifier 10 is controlled by a control signal a5. The variable gain amplifier 10 is, for example, composed of a voltage control amplifier (VCA). The input signal may be a signal detected by the pickup of a magneto-optic disk reproducing apparatus.

The control section 2 generates the control signal a5 corresponding to the output signal a2 of the variable gain amplifier 10, and outputs the control signal a5 to a control terminal of the variable gain amplifier 10.

An amplitude detector 3 receives the output signal a2 and outputs a signal a3 corresponding to the change in the amplitude of the output signal a2 to a control signal generator 4. As shown in FIG. 3, the amplitude detector 3 includes a clamping circuit 30 and an envelope detection circuit 31 which are conventionally known. The output signal a2 from the variable gain amplifier is clamped by the clamping circuit 30. Thereafter, by the envelope detection circuit 31, the clamped signal is output as a signal corresponding to the amplitude of the output signal a2.

The control signal generator 4 includes a comparator 40, a reference voltage generator 42 and a filter 41. The comparator 40 outputs a signal b2 to the filter 41 based on the difference between the signal a3 from the envelope detection circuit 31 and an output c2 from the reference voltage generator 42. The filter 41 generates the control signal a4 of the variable gain amplifier 10 from the signal b2.

The memory section 5 includes an A/D convertor 50, a memory 51, a D/A converter 52 and a filter 53. The A/D converter 50 converts a control signal a4, which is an analog signal, into control data b3 which is a digital signal. The memory 51 stores the control data b3. The D/A converter 52 converts control data b4, which is a digital signal, into a control signal b5 which is an analog signal. The filter 53 filters the signal b5 so as to be output.

Figure 15:
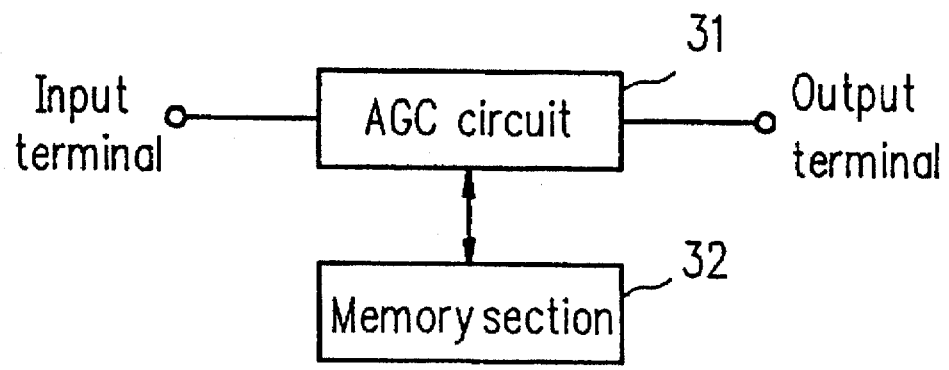
FIG. 15 is a diagram showing the configuration of a conventional AGC circuit.
Figure 16:
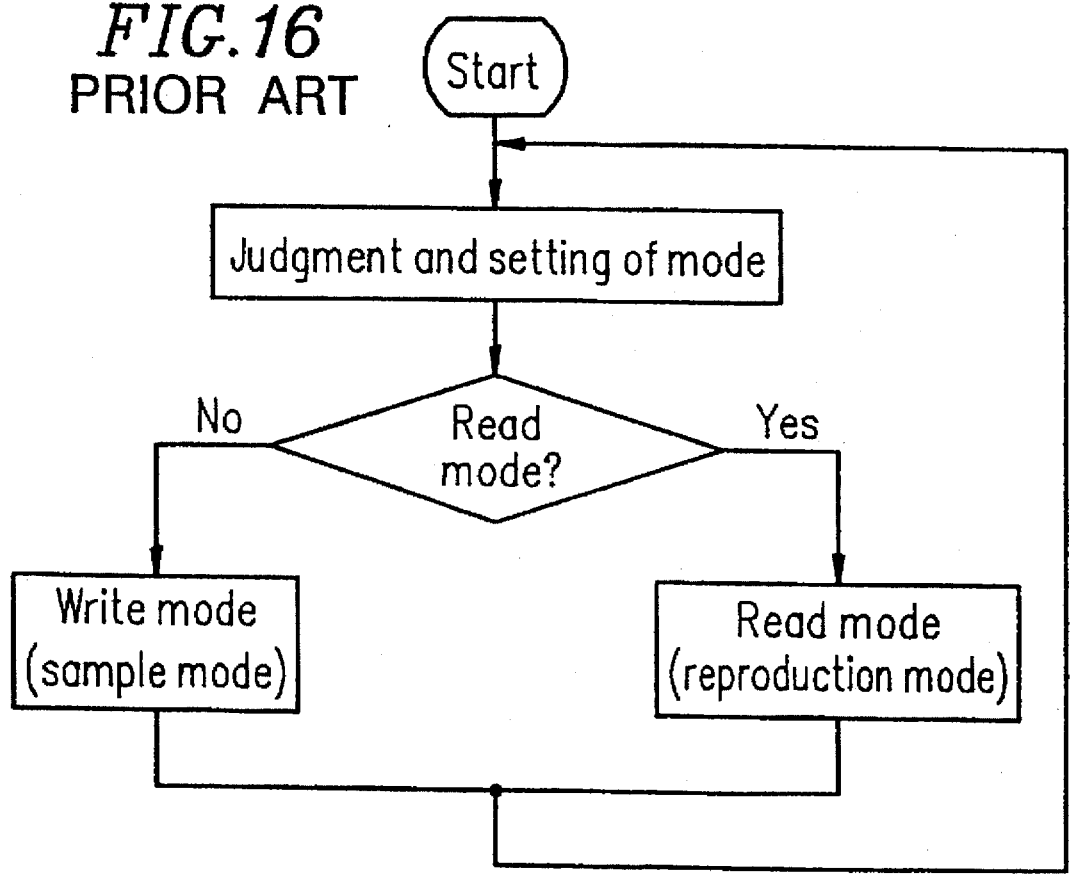
FIG. 16 is a flowchart showing the control process of the conventional AGC circuit.
Figure 17A:
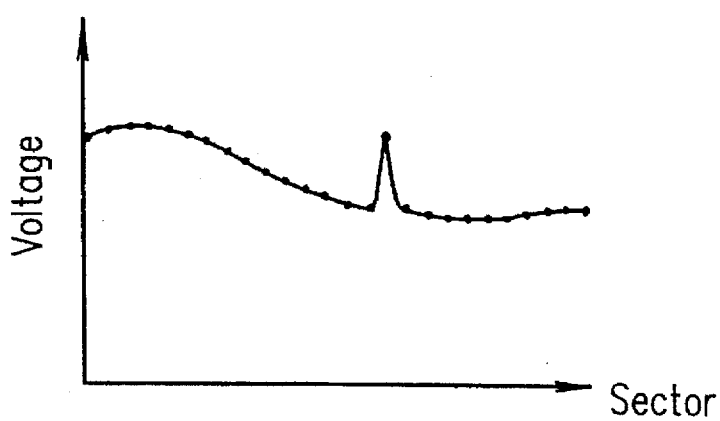
FIGS. 17A through 17C are diagrams for explaining problems of the conventional technique.
Figure 17B:
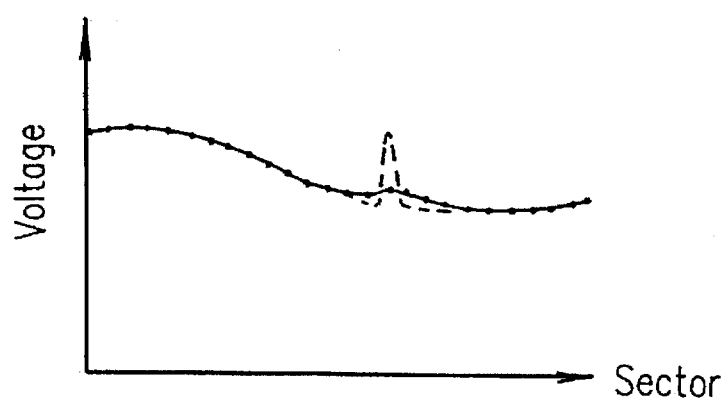
Figure 17C:
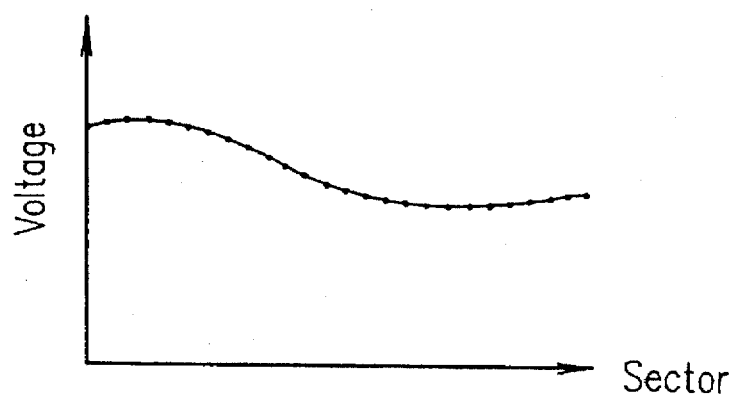

An interpolation section 6 with a CPU 60 performs the interpolation of the control data, the judgment and setting of an operation mode to be described later, the control of writing and reading of the control data and the like. The interpolation section 6 has software in which the procedure for controlling the CPU 60 is described, as well as the CPU 60 which is hardware. This software is stored, for example, in a ROM (Read Only Memory) (not shown) provided in the interpolation section 6. The interpolation section 6 determines whether or not the control data resulting from the defect pulse, i.e., error data, is to be replaced with interpolation data. If it is judged that the error data is replaced with the interpolation data, the interpolation data calculated by the CPU 60 is written into the memory 51. Thus, the error data is removed from among the control data, so that the interpolation data is used for controlling the variable gain amplifier. Unlike the conventional circuit shown in FIG. 15, the automatic gain controller of the present invention includes the interpolation section 6. As a result, even if the defect pulse is input thereto, the corresponding control data in the spike form is not output. Therefore, it becomes possible to avoid the malfunction of the AGC circuit, which allows the reproducing apparatus to have a lower error rate.

In connection with a reproduction position detector 7, utilizing a linear sensor 70 described in Japanese Laid-Open Patent Publication No. 60-10475, or using address information on the recording medium obtained from an address reproducing circuit (not shown), or the like may be applicable. The position where the memory section 5 stores the control data b3 in the memory 51 is determined based on an output a7 of the reproduction position detector 7.

Figure 4:
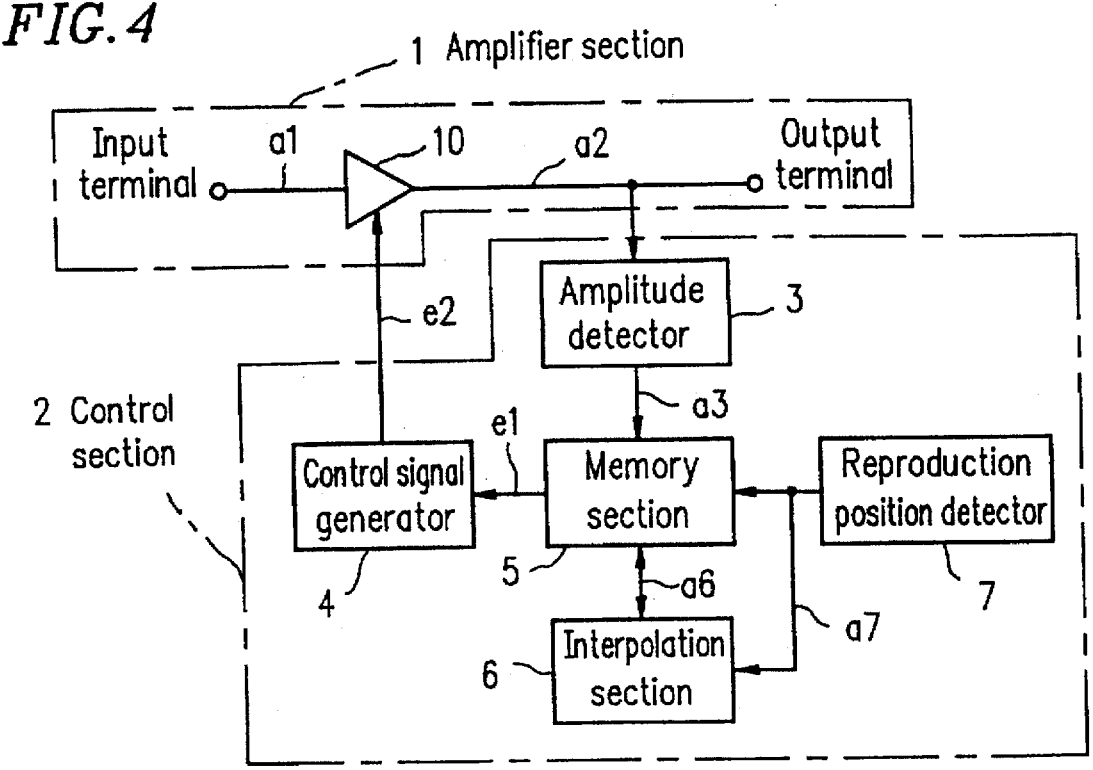
FIG. 4 is a block diagram showing the configuration of an AGC circuit of another example of the present invention.

FIG. 4 shows another example of the present invention. The AGC circuit configured as shown in FIG. 4 has the same effects as obtained by that in FIG. 2. In FIG. 4, the reproduction signal a1 input to the input terminal is amplified by the variable gain amplifier 10 and then output as the output signal a2. The change in the amplitude of the output signal a2 is detected by the amplitude detector 3. The result of the detection is stored in the memory section 5. The control signal generator 4 generates a control signal e2 of the variable gain amplifier 10 from an output e1 of the memory section 5.

FIGS. 5A through 5G are diagrams showing the waveform of the signal obtained at each component of the AGC circuit. FIG. 5A shows the waveform of the signal a1 input to the input terminal of the AGC circuit, i.e., the input terminal of the variable gain amplifier 10. The waveform of the signal a1 shows that the signal amplitude of each sector is not the same. FIG. 5B is a diagram showing a part of the waveform of the signal a1 shown in FIG. 5a in an enlarged form. FIG. 5C is the waveform of a signal b1. The signal b1 is a signal obtained by clamping the signal a2 by a clamping circuit, and shows that the signal amplitude of each sector is not the same. The envelope of the signal b1 reflects the amplitude of the input signal a1. FIG. 5D shows a waveform a3 representative of the envelope of the signal b1. FIG. 5E shows the waveform of the signal b2. The signal b2 is obtained by comparing the signal a3 with a reference voltage c2. FIG. 5F shows the waveform of the signal a4, which is an output obtained by filtering the signal b2 through the filter 41. FIG. 5G shows the waveform of the output signal a2 of the AGC circuit.

With reference to FIG. 6, the operation modes of the AGC circuit according to the present invention are described. This operation mode is determined by the interpolation section 6, based on the output a7 of the reproduction position detector 7 and other conditions. The CPU 60 of the interpolation section 6 generates a signal for executing each of the operation modes and controls other blocks such as the memory section 5. Herein, the step having three operation modes (a sample mode, an interpolation mode and a reproduction mode) is described.

In the sample mode, the control signal generator 4 generates the control signal a5 to be input to the variable gain amplifier 10. This control signal a5 is used to control the gain of the variable gain amplifier 10. Herein, a transient response arises in the control signal a5 of the variable gain amplifier 10 (the rising part of the waveform shown in FIG. 5G). After the transient response is stabilized, the signal a4 is written into the memory section 5, in accordance with the output a7 of the reproduction position detector 7.

In the interpolation mode, the error data is detected from among a plurality of control data stored in the memory section 5. The detected error data is replaced with interpolation data obtained by an interpolation.

In the reproduction mode, the reproduction position detector 7 determines the read position where the control data in the memory section 5 is used. Based on the output a7 of the reproduction position detector 7, the control signal a5 in accordance with the read position is output, so that the variable gain amplifier 10 is controlled.

The manner of determining each operation mode will be described hereinafter. The CPU 60 determines each of the operation modes and sets a switch 20 by using a signal c1. When the signal c1 is high (H), the switch 20 is set at a position of H. When the signal c1 is low (L), the switch 20 is set at a position of L. In the sample mode, the signal c1 is H. Accordingly, the output a4 of the control signal generator 4 is converted from an analog signal to a digital signal by the A/D converter 50. Thereafter, the converted signal is written into a predetermined address within the memory 51 allocated by the CPU 60. This sample mode is executed for the track read for the first time. For example, a flag (not shown) indicative of whether the track was previously accessed may be provided in the memory 51 in order to judge if the track is read for the first time. In the interpolation mode, the signal c1 is H, and the interpolation is performed for the data within the memory 51. In the reproduction mode, the signal c1 is L. The control data is partially replaced with the interpolation data by the interpolation section 6. The D/A convertor 52 converts the control data from a digital signal stored in the memory 51 into an analog signal. The control 15 signal b5 is, via the filter 53, input to the control terminal of the variable gain amplifier 10.

Figure 7:
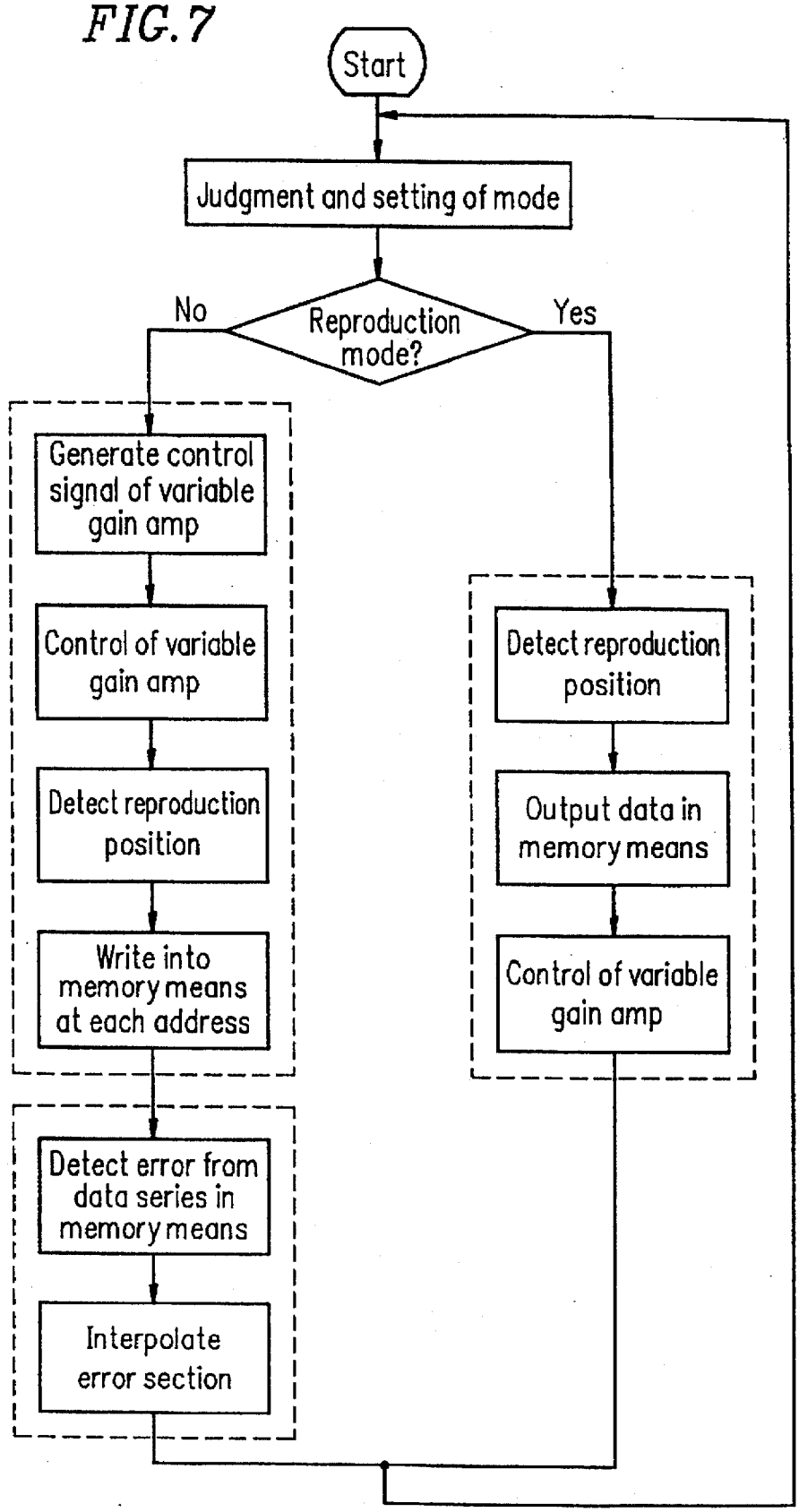
FIG. 7 is a flow chart showing the operation mode for the AGC circuit shown in FIG. 2 in more detail.

FIG. 7 is a flow chart showing FIG. 6 in more detail. In the sample mode, first, the control signal of the variable gain amplifier is generated. The variable gain amplifier is controlled by using this control signal. Next, the point where information is read from the reading medium, i.e., the reproduction position, is detected. In accordance with the detected reproduction position, the address onto which the control data is written is allocated on the memory 51 of the memory section 5. The A/D converted control signal, that is, the control data is written onto the allocated address. In the interpolation mode, error data is detected from among the control data series stored in the memory section. In the case where the detected data is judged to be error data, the error data is replaced with the interpolation data. In the reproduction mode, in accordance with the detected reproduction position, the control data stored in the memory section is output. This control data is D/A converted so as to control the variable gain amplifier 10.

Figure 8:
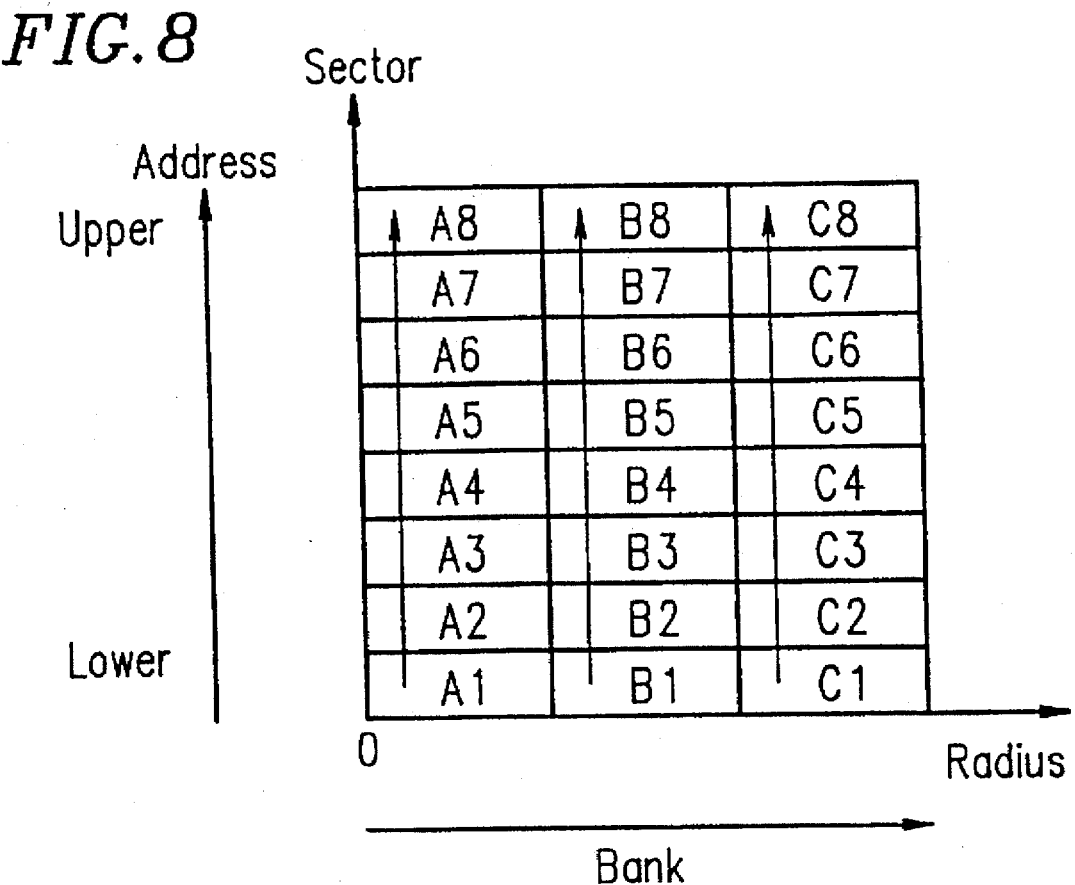
FIG. 8 is a diagram showing one exemplary method of locating a control signal in a memory section.

FIG. 8 shows the method of placing the control data b3 in the memory section 5. The control data of each sector is sequentially placed from the lower to the upper address of the memory 51. The memory 51 has a bank, and a series of control data within the same radius is placed in the same bank. This placement allows the control data to be accessed more rapidly. The data thus placed in the memory 51 is interpolated by the CPU 60 per a certain number of data. For the interpolation, a method of using the data adjacent along the vertical axis shown in FIG. 8 may be employed. For example, a method of calculating the interpolation data by using A1 and A2 may be employed. Alternatively, a method of using the data adjacent along the horizontal axis shown in FIG. 8 may be employed. In this case, the interpolation data is calculated using e.g., A1 and B1. In place of the two-dimensional data placement method as shown in FIG. 8, a one-dimensional data placement method may be employed, whereby the data is placed on the successive addresses in a sequential order.

The following methods (1) and (2) of interpolating the error data are described in "Shin-ban Dejitaru Oudio (New Digital Audio)" (pp. 209–211, Toshitada Doi et al., published by Rajio-gijyutsu-sha, 1988, Japan): (1) the zero order interpolation for replacing the value of the error data with the value of its precedent correct data (A(n) is replaced with A(n−1)); and (2) the first-order interpolation for replacing the value of the error data (A(n)) with the value obtained by linearly approximating the precedent two values (A(n−1) and A(n−2)), where a sampling value sampled at a time t(n) (n: natural number) is denoted by A(n) and that A(n) is a value to be subjected to the interpolation. The mean value interpolation for replacing the value of the error data (A(n)) with the value of the mean value of those of its precedent and following correct data (i.e., A(n) is replaced with the mean value of $\{A(n-1)+A(n+1)\}/2$) can be used as a method which is not described in the above reference The zero order interpolation, necessitating no calculation for the interpolation, assures a rapid operation. The first-order interpolation is more correct than the zero order interpolation, because it can follow the linear change of the control data. The mean value interpolation assures an interpolation more correct than those achieved by the other techniques, because it uses the preceding and following values of the error data. Meanwhile, the intervals of the sampling should be set large to the extent that the defect pulse does not arise in a plurality of successive sampling values.

Figure 9A:
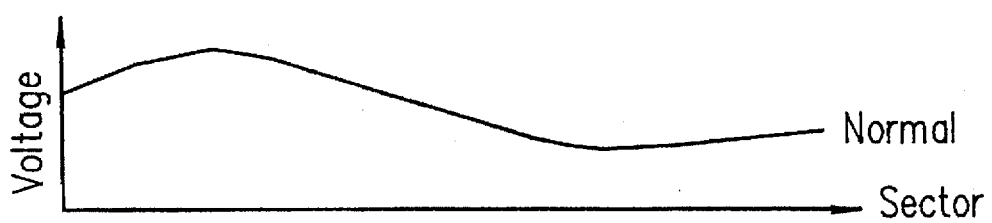
FIGS. 9A through 9D are graphs showing control signals for explaining the method of detecting an error signal.
Figure 9B:
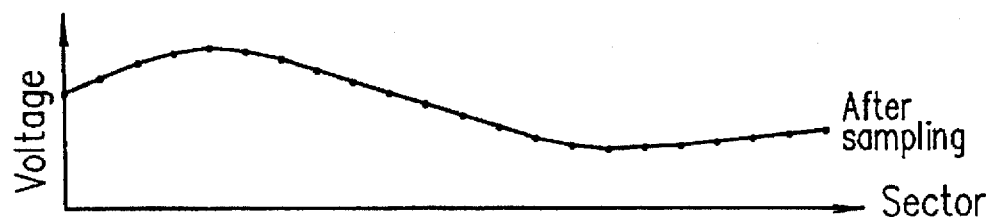
Figure 9C:
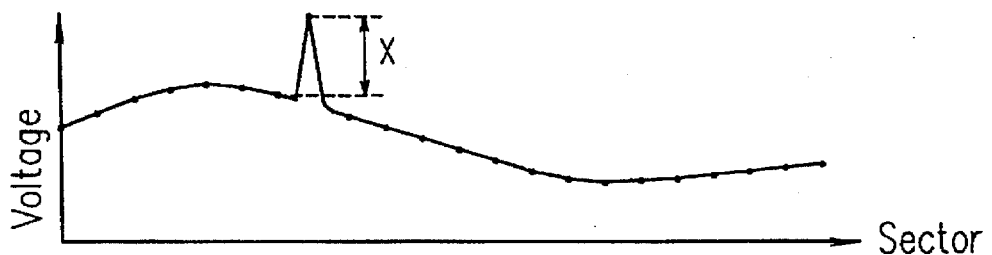
Figure 9D:
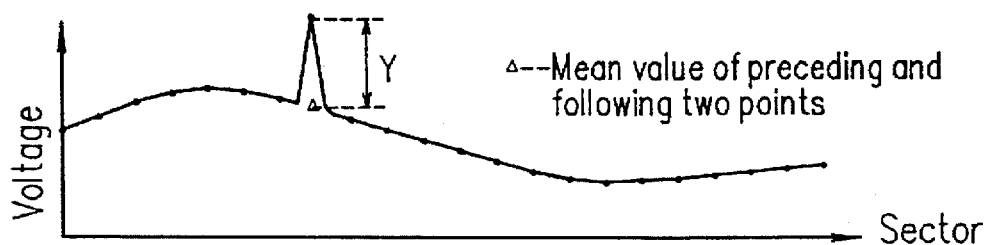

There are several techniques usable for deciding whether to perform the interpolation for each of the sampling points in the output a2 of the variable gain amplifier 10. Hereinafter, such a technique will be referred to as "an error data detection method". With reference to FIGS. 9A through 9D, the error data detection methods will be described. FIG. 9a shows the output waveform of the control signal generator 4 shown in FIG. 3. The dots shown on the graph of FIG. 9B each represent the point at which the output waveform is sampled by the A/D converter 50. The sampled value obtained herein is rendered the control data. FIG. 9B shows the case where no defect pulse exists. FIGS. 9C and 9D each shows the waveform when the output a4 of the control signal generator 4 is overlapped with the error signal corresponding to the defect pulse. The result of sampling the error signal is called "the error data". According to one method for judging the error data, if the difference X from the immediately preceding sampling value, as shown in FIG. 9C, exceeds a predetermined value, the control data at the sampling point is regarded as the error data.

According to another error data detection method, the mean value of the preceding n (n: natural number) points and following n points of the sampled point is calculated as shown in FIG. 9D. If the difference Y between the mean value and the value of the stored control signal exceeds a predetermined value, the control signal is detected as the error data. Alternatively, in order to further emphasize the component of the error data, a weighting operation may be performed when calculating the above-mentioned mean value. Also, a method obtained by combining the above-mentioned two methods is possible. Then, the error data is replaced with the control signal interpolated with the error signal by the interpolation section 6. Thus, the variable gain amplifier 10 can be controlled more correctly even if the defect pulse exists in the input.

The error data may be detected by another detection method, for example, by using the difference between the sampling value A(n) and the value interpolated by linearly approximating the immediately preceding two sampling values A(n−1) and A(n−2). This method assures a rapid processing since the error data can be detected only by addition and subtraction. According to still another method, the product of (A(n+1)−A(n)) and (A(n)−A(n−1)) is obtained and the control signal is regarded as the error data if the product is negative and larger than a predetermined value. This method assures a more rapid processing than that of the method of obtaining the mean value. In addition, the threshold value at the time of error data detection may be determined in several manners. In one manner, the threshold value is the value obtained by dividing the difference between the maximum value and the minimum value of the amplitude of the reproduction signals per one round of tracks by the number of sampling points. In another manner, the threshold value is the value obtained by averaging the absolute value of the difference of amplitude between two adjacent points on the disk over one round of tracks.

Figure 10:
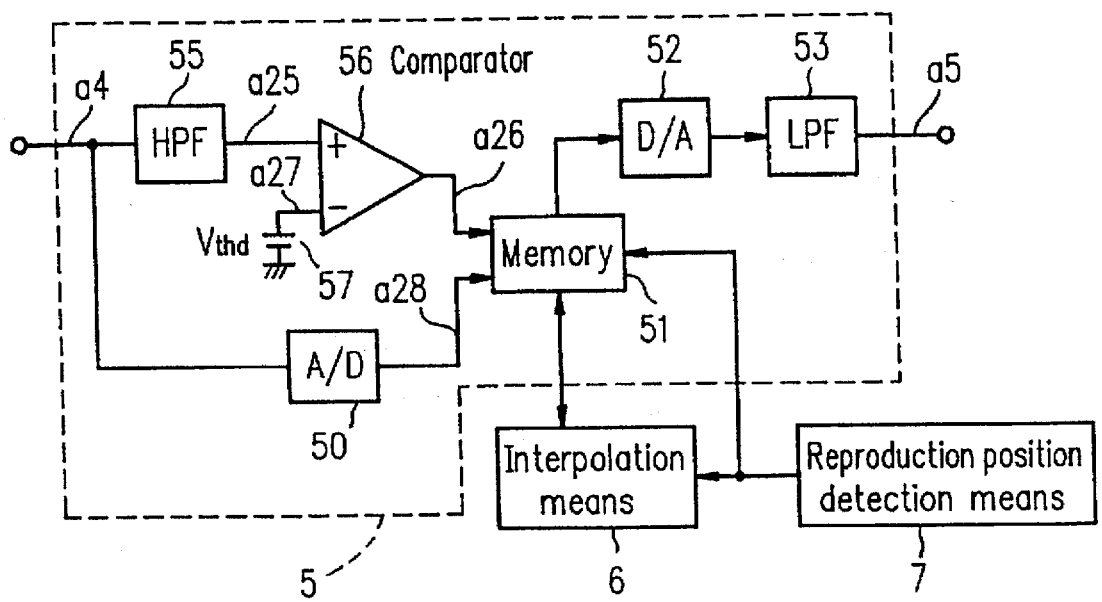
FIG. 10 is a block diagram showing an exemplary configuration of the memory section.
Figure 11A:
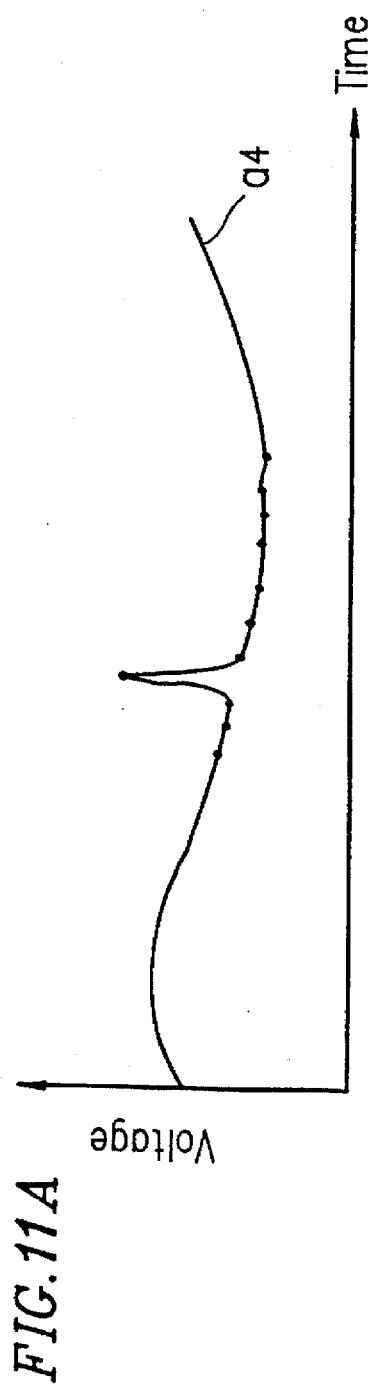
FIGS. 11A through 11C are diagrams showing the waveform of each component of the memory section shown in FIG. 10.
Figure 11B:
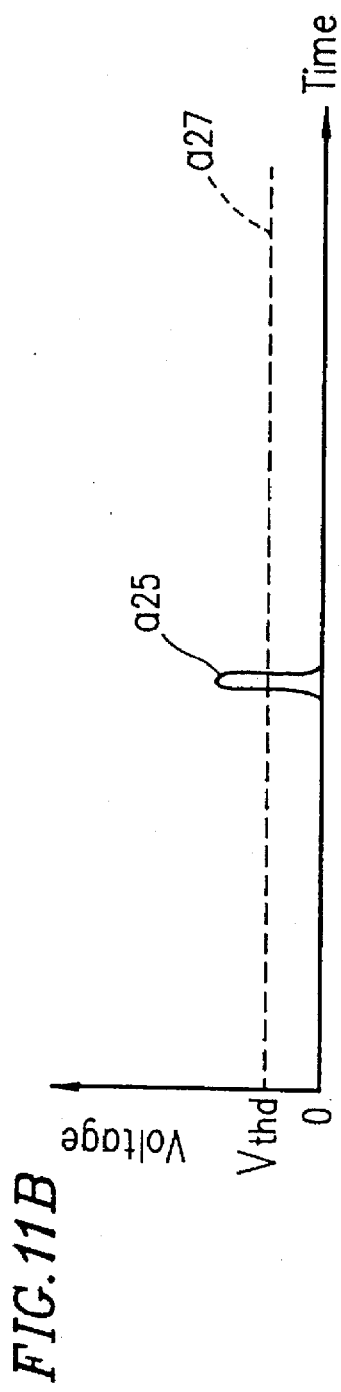
Figure 11C:
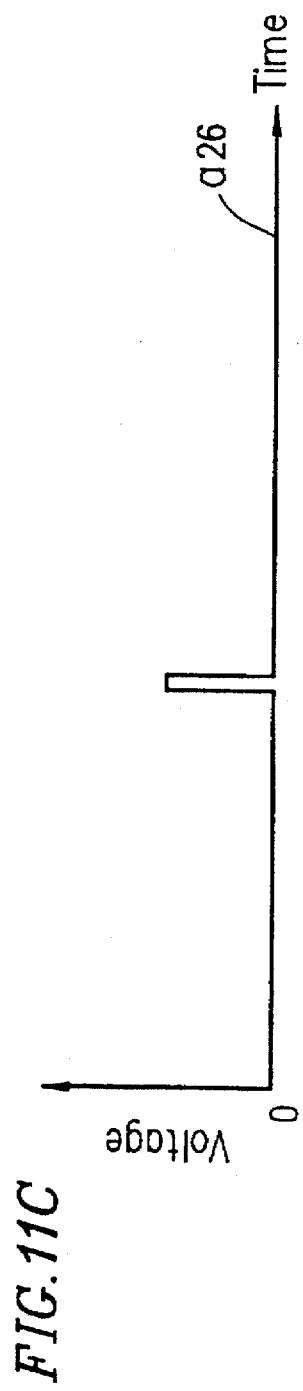

FIG. 10 shows the configuration of the memory section of an automatic gain controller according to another example of the present invention. There is another method where only a high-frequency component is extracted from the control signal a4 by a high-pass filter (HPF) 55 so as to detect the error signal. The extracted high frequency component is output to a comparator 56. The comparator 56 compares the high frequency component of the control signal a4 with a reference voltage source a27. When the voltage of the high frequency component of the control signal a4 is higher than the voltage of the reference voltage source a27, an output a26 of the comparator 56 is at the HIGH level. The output a26 is an error bit indicating if the control signal a4 is an error signal. The control signal a4 is A/D converted by an A/D converter 50, and output as control data a28. The error bit a26 is applied to a memory 51 with the control data a28. After replacing the error data, an output of the memory 51 is converted into an analog signal by a D/A converter 52. The converted analog signal is output as an output a5 via LPF 53. By using this method, when the control data is recorded into the memory, it can be simultaneously recorded that the control data is the error data. Accordingly, by using this method, the processing of software can be performed more easily compared with the method of detecting the error data from the data series once recorded in the memory, FIGS. 11A through 11C are diagrams showing the waveform of each component of the memory section shown in FIG. 10. FIG. 11A shows the result of A/D conversion of the control signal a4 (indicated by dots), and FIG. 11B shows the output a25 when the control signal a4 is input to the high-pass filter (HPF) 55. FIG. 11C is the waveform of the error bit a26 obtained by A/D converting a HPF output a25 using a threshold value Vthd (a27) of the reference voltage source 57, showing the result of the detection of the error signal. The result of the detection of the error bit, i.e., a26, and the output a28 of the A/D convertor 41 are simultaneously recorded into the memory 51. At this time, in order to record the error signal detection result a26, one bit of memory region needs to be available. Thus, the sampling of the control signal and the detection of the error signal can be performed at the same time, which assures high-speed processing.

Figure 12:
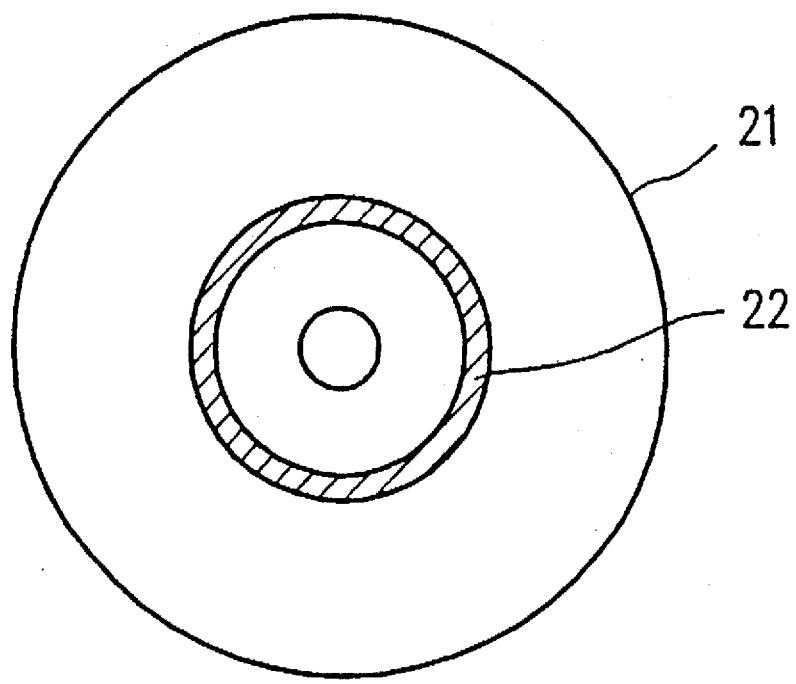
FIG. 12 is a plan view showing a disk.
Figure 13:
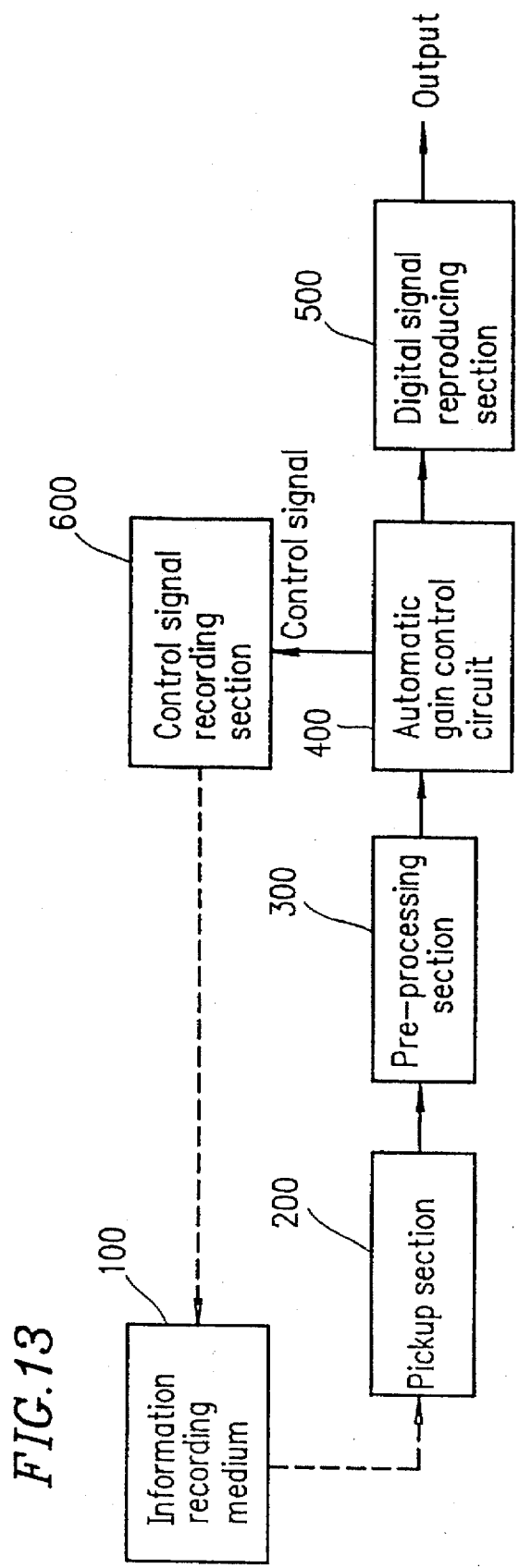
FIG. 13 is a block diagram showing the information reproducing apparatus, in which the interpolated control data existing in the memory section is recorded onto the disk shown in FIG. 12.
Figure 14A:
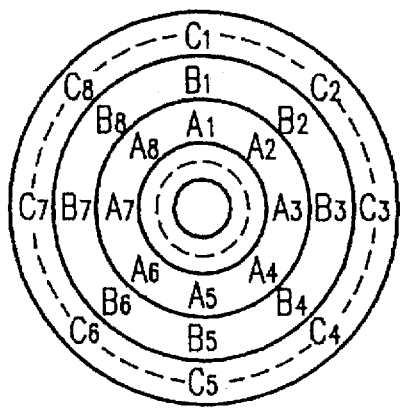
FIG. 14A is a plan view showing a disk.
Figure 14B:
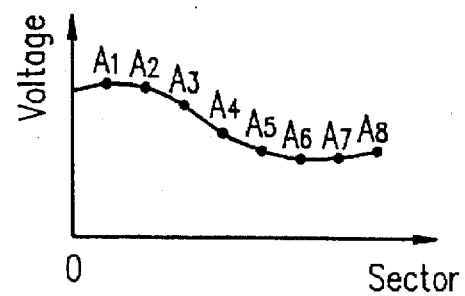
FIG. 14B is a diagram showing sector-voltage characteristics when reproducing data from one track of the center portion (A1 to A8) of the disk shown in FIG. 14A.
Figure 14C:
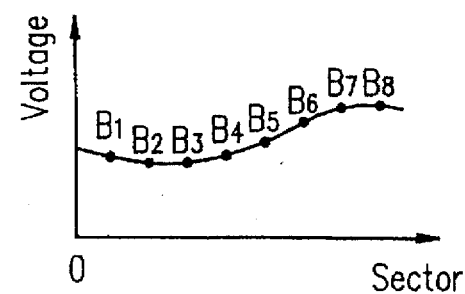
FIG. 14C is a diagram showing sector-voltage characteristics when reproducing data from one track of the middle portion (B1 to B8) of the disk shown in FIG. 14A.
Figure 14D:
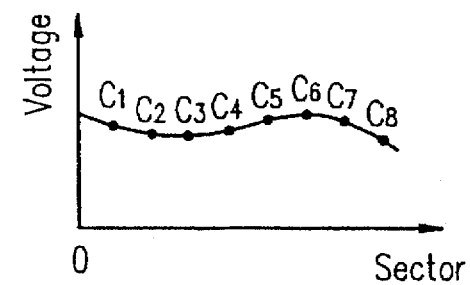
FIG. 14D is a diagram showing sector-voltage characteristics when reproducing data from one track of the peripheral portion (C1 to C8) of the disk shown in FIG. 14A.
Figure 14E:
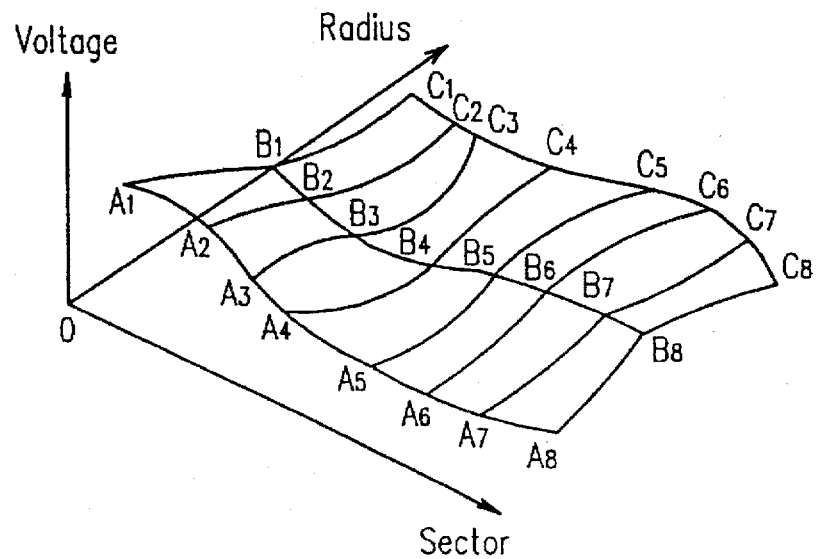
FIG. 14E is a diagram three-dimensionally showing the changes of the amplitude in each of sectors within the disk shown in FIGS. 14B through 14D.

With reference to FIGS. 12 and 13, a method for recording the interpolated control data within the memory section 5 will be described. By using a control signal recording section 600 shown in FIG. 13, the interpolated control data can be written into a part 22 of a disk 21 shown in FIG. 12. This makes it possible to store the control information for controlling the AGC circuit, inherent to the disk 21. The interpolated control data is stored in an external recording medium, and thus there is no need of performing the interpolation for each reproducing operation. At the time of the reproducing operation, the control information relating to the entire disk can be taken out by reading the part 22 of the disk 21. The recording position is not restricted to the part 22. The control information of the AGC circuit can be recorded into any desired portion on the disk 21. The control information can be recorded, for example, into a recording medium such as a semiconductor memory (e.g., RAM: Random Access Memory) or a bar code attached to a cartridge.

The sampling need not be performed for all the tracks, because the recording medium has general characteristics that factors determining the control signal of the AGC circuit, such as the reflectance of the disk, do not so drastically change between adjacent tracks. For example, the memory section 5 with a smaller memory capacity can become usable by performing the sampling per dozens of tracks. Furthermore, the control signal of the AGC circuit for dozens of tracks may be represented by one control signal, whereby a control without being affected by a defect of the recording medium existing within the dozens of tracks is assured. The sampling of this type can be performed, for example, at the time of soft-format. Herein, "soft-format" indicates a format carried out so as to form a sector on a disk without a sector.

The timing at which the control signal is sampled and taken into the memory section 5 will be described. The sampling is performed at each Resync section, or at several points within the Resync section. The Resync section enables an information reproducing device to regain byte synchronization after a large defect in the data field is detected. This may be performed for each sector, or for each of several sectors. The data region within the sector tends to increase for the purpose of improving the recording efficiency. Accordingly, it is desirable that the amplitude of the reproduction signal is sampled from the Resync section which makes the amplitude thereof larger than those obtained at other signal sections within the data region. In this case, the number of sampling points becomes too large if sampling the reproduction signal of all the Resync sections. Therefore, selective sampling is preferable from the viewpoint of the processing time, the capacity of the memory device, etc. Thus, the changes in the amplitude within the sector do not cause problems. In the case of the format of usual sectors, the sampling can be effectively performed for each sector or for each of several sectors.

The data taken into the memory section will be described. It is preferable to sample the amplitude of the signal having a large amplitude and reproducing the same recording mark. In order to appropriately detect the changes in the amplitude, the difference in amplitude between the reproduction signals for the same recording mark is utilized. This is achieved by sampling the amplitude of the reproduction signal of the same recording mark. Meanwhile, the dynamic range of the circuit can be more effectively used by sampling the amplitude of the reproduction signal of the recording mark with a large amplitude, such as a sector mark and the Resync section.

As described above, the data on the amplitude of the signal reproduced from the recording medium is taken in per sector or per Resync section at the predetermined timing. Accordingly, when using the data within the recording medium, the data is output as the control voltage of the variable gain amplifier (e.g., VCA) at the same timing as it was taken in.

The examples described in the foregoing can be widely applicable to devices requiring an AGC circuit and in which the control voltage given to the AGC circuit changes continuously and periodically. Specifically, they are applicable to a device for reproducing information using an optical technique.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information reproducing apparatus comprising:
   pickup means for converting information recorded in a recording medium into an electrical signal;
   preprocessing means for amplifying a signal output from the pickup means;
   an automatic gain controller for receiving a signal output from the preprocessing means as an input signal and for eliminating an amplitude change component other than the information from the input signal; and
   digital signal reproducing means for reproducing a digital signal corresponding to a signal output from the automatic gain controller,
   the automatic gain controller including:
      an amplifier for amplifying the input signal so as to be output as an output signal, and for receiving a control signal for controlling a gain; and
      an amplifier controller for controlling the gain of the amplifier,
   the amplifier controller including:
      an amplitude detector for detecting an amplitude of the output signal;
      a control signal generator for generating a control signal corresponding to the amplitude of the output signal;
      a memory for storing the control signal; and
      an interpolator for detecting an error data in the control signal and replacing the error data with an interpolation data.

2. An information reproducing apparatus according to claim 1, further comprising control signal recording means for recording the control signal with the interpolation data on the recording medium.

3. An information reproducing apparatus according to claim 1, wherein the recording medium is a magneto-optic disk.

4. An information reproducing apparatus according to claim 1, wherein the interpolator replaces an error data corresponding to a time t(n) with an interpolation data obtained by averaging a control signal at a time t(n−1) and at a time t(n+1).

5. An information reproducing apparatus according to claim 1, wherein the interpolator replaces an error data corresponding to a time t(n) with an interpolation data obtained from a linear approximation for time t(n), the linear approximation utilizing values of the control signal at a time t(n−2) and at a time t(n−1).

6. An information reproducing apparatus according to claim 1, wherein the interpolator replaces an error data corresponding to a time t(n) with a control signal at a time t(n−1).

7. An information reproducing apparatus according to claim 1, the memory including:

a high-pass filter, a comparator, a reference voltage source, and a memory, wherein the high-pass filter receives the control signal as an input signal and outputs a high frequency component of the control signal to the comparator as an output signal, and wherein the comparator, by comparing the output voltage of the high-pass filter with the voltage of the reference voltage source, outputs an error bit to the memory, the error bit indicating whether the control signal includes the error data.

8. An information reproducing apparatus according to claim 1, wherein, in the control signal, the error data represents a pulse exceeding a reference value.

9. An information reproducing apparatus comprising:

pickup means for converting information recorded in a recording medium into an electrical signal;

an automatic gain controller for receiving a signal output from the pickup means as an input signal and for eliminating a non information amplitude change component from the input signal; and digital signal reproducing means for reproducing a digital signal corresponding to a signal output from the automatic gain controller;

the automatic gain controller including:

an amplifier for amplifying the input signal so as to be output as an output signal, and for receiving an amplifier control signal for controlling a gain; and an amplifier controller which generates the amplifier control signal, wherein, when the amplifier controller detects error data and the output signal, the amplifier controller performs an interpolation operation to replace the error data with an interpolation data.

* * * * *